United States Patent [19]

Robyn et al.

[11] Patent Number: 4,489,022
[45] Date of Patent: Dec. 18, 1984

[54] FORMING COHERENT REFRACTORY MASSES

[75] Inventors: Pierre Robyn, Nivelles; Pierre Deschepper, Charleroi, both of Belgium

[73] Assignee: Glaverbel, Brussels, Belgium

[21] Appl. No.: 420,502

[22] Filed: Sep. 17, 1982

[30] Foreign Application Priority Data

Nov. 25, 1981 [GB] United Kingdom ............... 8135569

[51] Int. Cl.³ .............................................. F27D 1/16
[52] U.S. Cl. ........................................ 264/30; 75/27; 266/281
[58] Field of Search ............... 264/30; 75/27; 266/281

[56] References Cited

FOREIGN PATENT DOCUMENTS 1330894 9/1973 United Kingdom .

Primary Examiner—Donald Czaja
Assistant Examiner—V. Fischbach
Attorney, Agent, or Firm—Spencer & Frank

[57] ABSTRACT

In a process of forming a refractory mass in which having an average grain size of less than 50 μm are burned while mixed with solid particles of at least one incombustible refractory material during projection of the mixture against a surface to form a coherent mass on said surface, the oxidizable material comprises silicon and aluminium, the aluminium being present in an amount not exceeding 12% by weight of the total mixture.

14 Claims, 2 Drawing Figures

FORMING COHERENT REFRACTORY MASSES

BACKGROUND OF THE INVENTION

This invention relates to a process of forming a refractory mass in which solid particles of exothermically oxidisable material are burned while mixed with solid particles of at least one incombustible refractory material.

Such a process is known, for example from Glaverbel's British Patent Specification No. 1,330,894. The process for forming such a refractory mass can be used for forming refractory coatings on refractory blocks and other surfaces, and the process is especially suitable for repairing or strengthening furnace linings in situ, and can in many cases be used while the furnace is still operating.

SUMMARY OF THE INVENTION

It has now been found that the choice of oxidisable material used in the projected mixture has an important effect on the way in which combustion takes place and thus on the cohesiveness of the refractory mass obtained.

It is a principal object of the present invention to provide a process in which the oxidisable material used in the starting mixture is selected to give improved results.

According to the present invention, there is provided a process of forming a refractory mass characterised in that particles of exothermically oxidisable material having an average grain size less than 50 $\mu$m are burned while mixed with particles of incombustible refractory material during projection of the mixture against a surface to form a coherent refractory mass on said surface, and in that said oxidisable material comprises silicon and aluminium, the aluminium being present in an amount not exceeding 12% by weight of the total mixture.

Where it is stated herein that particles of a given material have an average grain size less than a specified value, this denotes that at least 50% by weight of the particles have a grain size less than that value.

DETAILED DESCRIPTION OF THE INVENTION

It has been found that the use of aluminium in an amount of 12% or less by weight of the total mixture is efficacious for promoting initiation of the reactions which must take place during projection of the starting mixture, and that because the proportion of aluminium which is present is only 12% by weight at maximum, there is no marked tendency for flash-back to occur during the projection. The use of silicon in combination with the aluminium has a very favourable effect on the rate at which the reactions take place during projection and gives rise to a highly acceptable refractory product. As a result of the way in which the reactions proceed during projection, the refractory mass obtained has improved cohesiveness.

The use of combustible particles of the dimensions specified assures excellent reactivity so that oxidation of the oxidisable material constituted by the silicon and aluminium is substantially complete. This has the important advantages of not polluting the refractory mass formed with still-oxidisable material and particularly of furnishing the maximum heat possible to the incombustible refractory material.

Preferably the maximum grain size of said particles of silicon and aluminium is not more than 100 $\mu$m and optimally such maximum grain size is not more than 50 $\mu$m.

It has been found that even better results are achieved when said oxidisable material has a specific surface greater than 3000 cm$^2$/g as is preferred. Said silicon particles may for example have a specific surface in the range 3000 to 8000 cm$^2$/g. Alternatively or in addition, said aluminium particles may for example have a specific surface in the range 3000 to 12000 cm$^2$/g. For the best results, each such oxidisable substance has a specific surface in the range 4000 to 6000 cm$^2$/g.

In preferred embodiments of the invention, the aluminium is present in an amount not exceeding 9% by weight of the total mixture. This further limits the risk of flash-back during projection of the mixture while still allowing good initiation of the reactions.

Preferably, the aluminium and silicon are together present in an amount not exceeding 20% by weight of the total mixture. The use of such quantities of aluminium and silicon promotes a favourable compromise between a high heat output and a relatively low quantity of combustible material used. It has been found that the heat generated by combustion of aluminium and silicon present in such proportions can be quite sufficient to bring about at least surface-melting of particles of a range of refractory materials which are useful as the incombustible component of the projected mixture to ensure good cohesiveness of the product. For example the use of such quantities of oxidisable material can allow at least surface-melting of highly refractory particulate material such as particles of quartz-free silica and zirconiferous particles, and this allows a process according to the invention to be used in the repair of refractories for coking, glass manufacturing and metallurgical purposes. There is therefore a number of very satisfactory incombustible substances from which a selection can be made, and very good results can be obtained by the process using starting materials of modest cost. Furthermore, by suitable choice of incombustible refractory particles, the use of small quantities of such oxidisable materials allows treatment, for example repair, of refractory articles which are silicon- and/or aluminium-free by depositing thereon a coherent refractory mass whose composition is as close as possible to that of the treated article when this is desired.

For the best results, the aluminium and silicon are together present in an amount in the range 10% to 15% inclusive by weight of the total mixture.

In some preferred embodiments of the invention, the total mixture comprises by weight 9% to 15% inclusive silicon and up to 7% aluminium.

In other preferred embodiments of the invention, the total mixture comprises by weight 3% to 9% inclusive silicon and 3% to 9% inclusive aluminium.

The incombustible refractory material of the projected mixture preferably comprises one or more of $SiO_2$, $ZrO_2$, $Al_2O_3$, $MgO$, sillimanite, mullite, zircon. The actual choice of material or materials to be used in any particular circumstances will depend on the conditions under which the product is to be used. Apart from the temperature which must be withstood in use and any desired resistance to erosion by a material, for example molten metal or glass, with which the refractory product will come into contact, there may be a problem of adherence between the refractory mass formed in accordance with the invention and a second refractory body. Such a problem arises for example in the in situ repair of furnaces or when lining parts which are particularly susceptible to erosion such as pouring spouts. In fact in the case of furnace repair it is generally desirable that the refractory product of the present invention should have generally similar refractory properties to the surface being repaired, but in cases where local areas of refractory material are particularly vulnerable to erosion it may be desirable to form a lining of a more refractory material. In any of these circumstances, where a refractory mass is to be formed by a process according to this invention on a second refractory body it is desirable to take the composition of that second refractory body into account when preparing a starting mixture for use according to this invention to ensure that the formed refractory mass comprises a substance which is a major constituent of the said refractory body.

Alternatively or in addition it is highly desirable to ensure that the coefficient of thermal expansion of the formed refractory mass has a value close to that of the coefficient of thermal expansion of the said refractory body so that the mass formed on the second body does not become detached due to thermally induced stresses.

Thus for example when repairing furnaces formed from basic refractory blocks wholly or mainly consisting of magnesia, the incombustible material sprayed in the mixture may consist exclusively of magnesia particles. If on the other hand it is desired to form a more refractory lining on for example a pouring spout made of magnesia, the incombustible material sprayed may for example comprise by weight 40% MgO and 40% $ZrO_2$.

Similarly, when repairing aluminous or silico-aluminous refractories, the starting mixture should desirably contain alumina and/or sillimanite and/or mullite; for silica refractories, silica particles may be projected; and for zirconiferous refractories, zirconia or zircon.

When comparing the constituents of the starting material and the second refractory body for the purpose of securing good adherence, perfectly acceptable results are achieved by considering double compounds, for example silicates, as mixtures of oxides.

Melting of the said incombustible refractory particles of said mixture is governed in part by the grain size of such particles. To promote such melting and thus the cohesiveness of the refractory product, and also to admit of the possibility of a completely fused refractory product, it is preferred that such particles should have an average grain size of less than 500 $\mu$m, preferably less than 300 $\mu$m.

The starting mixture of the present invention may be, and preferably is, projected using apparatus as described in Glaverbel's British Patent specification No. 1,330,895 whose disclosure is hereby incorporated into this specification. Such apparatus may be, and preferably is, modified as will be described hereinafter.

The present invention is particularly useful for repairing furnace linings in situ. Provided that the damaged area is accessible, that is, not covered by the contents of the furnace such repair can in many cases be carried out while the furnace is still operating so that no production is lost. In other cases it may be necessary to empty or partly empty the furnace, but there is no need to wait for the furnace to cool, so that production loss and reheating costs are minimised. In fact purely from the point of view of formation of the adherent refractory body it is in many cases preferable for the starting mixture to be projected against a hot refractory surface.

The invention is also useful for forming highly refractory linings (by suitable choice of incombustible particles) on other refractory materials to form composite refractory bodies whether by way of repairing a used body or manufacturing a new composite refractory body, and also for the initial formation of refractory bricks and other articles.

The modification to the apparatus described in Glaverbel's said British Patent specification will now be described with reference to the accompanying diagrammatic drawings in which.

Figure 1:
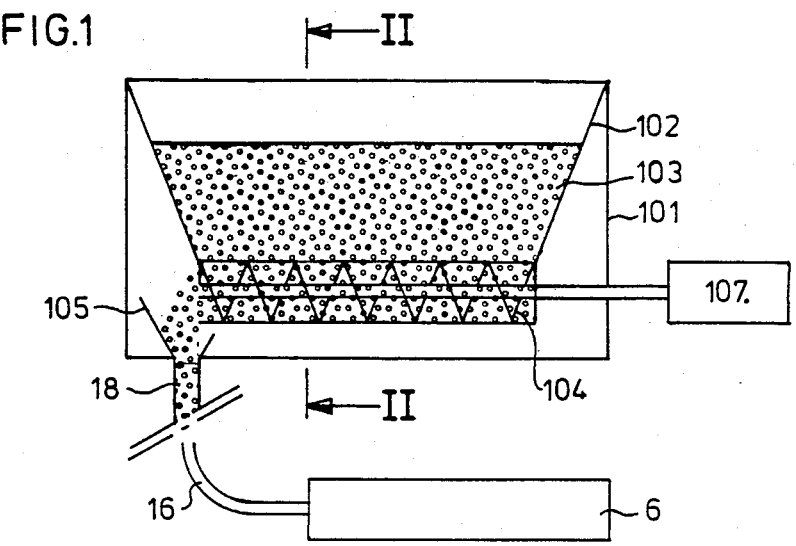
FIG. 1 is a view of the modified apparatus.
Figure 2:
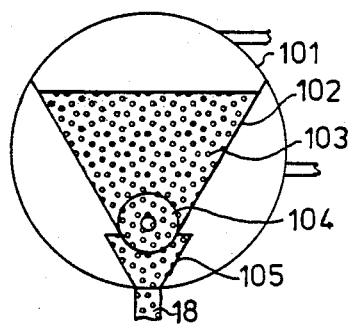
FIG. 2 is a detail cross section on the line II—II of FIG. 1.
Figure 1:
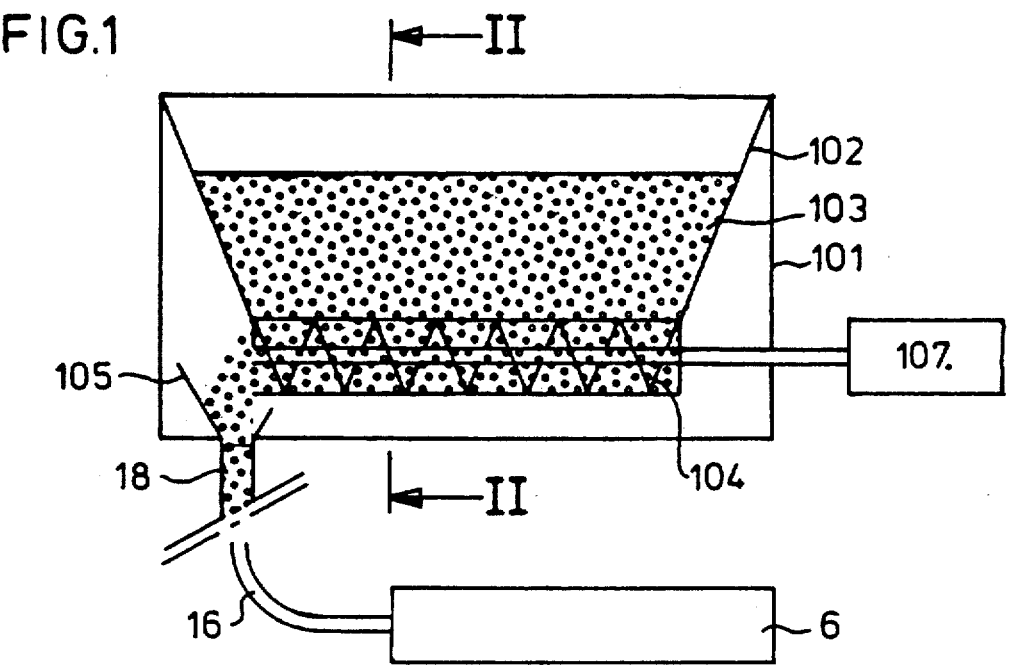
Figure 2:
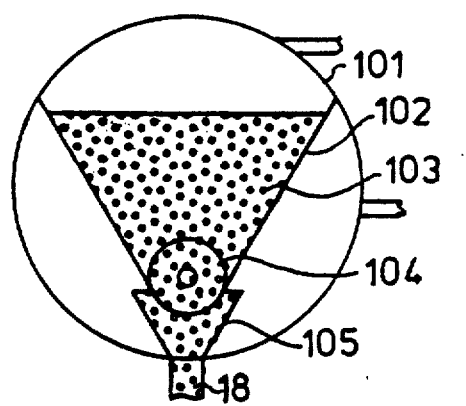

In the drawings, a cylinder 101 has suspended therein a trough 102 dividing the cylinder into two compartments which are gas-tightly sealed from one another. Particulate starting mixture 103 is contained within the trough 102 and can be fed therefrom by a screw 104 to fall through a funnel 105 into a rigid pipe 18 leading from the cylinder. As shown in FIG. 1, the screw 104 is drivable by a motor 107, and the starting mixture is fed to a lance 6 via a flexible hose 16. The pipe 18, lance 6 and hose 16 are here allotted the same reference numerals as in British Patent specification No. 1,330,895 and may be of the same construction.

In use, the trough compartment containing the starting mixture 103 is filled with nitrogen at a slightly higher pressure than the remainder of the cylinder 101 which is fed with oxygen. Covering the starting mixture 103 with nitrogen in this way is advantageous for safety reasons in the event of flash-back from the lance 6.

In an alternative embodiment, some or all of the oxygen required is fed to the lance head separately from the starting mixture and is there mixed for projection, the starting mixture being fed in a stream of nitrogen.

In a further variant, the combustible particles of the starting mixture are fed to the lance head in a stream of nitrogen and are there mixed with the incombustible particles which have been fed in a stream of oxygen. This further variant gives maximum safety and enables the amount of nitrogen used to be kept at a low level.

The following are some examples of processes according to the invention performed using the apparatus described in Glaverbel's said British Patent specification No. 1,330,895 modified as described above.

EXAMPLE I

Basic refractory blocks in the roof of a glass melting furnace were repaired in situ by a process according to the invention using a starting mixture which consisted of, by weight 88% particles of electro-cast magnesia with a grain size between 100 $\mu$m and 400 $\mu$m, 10% silicon and 2% aluminium. The silicon was in the form of particles having a maximum size of 10 $\mu$m and a specific surface of 4000 $cm^2$/gram, and the aluminium was in the form of grains having an average grain size below 10 $\mu$m and a specific surface of 6000 $cm^2$/g. The mixture was projected at a rate of 0.5 kg/minute in a stream of oxygen delivered at 160 L/minute against the worn surface roof which was at a temperature in excess of 1000° C. to form an adherent cohesive refractory lining.

In a variant of this example, calcined magnesia was used instead of electro-cast magnesia.

In a further variant, part of the silicon was replaced by aluminium grains.

EXAMPLE II

A mixture was prepared containing by weight 35% $ZrO_2$ and 53% $Al_2O_3$ as incombustible refractory particles having a grain size between 50 μm and 500 μm with 8% Si and 4% Al as combustible particles having the granulometry set forth in Example I. This starting mixture was projected in a stream of oxygen at the feed rates specified in Example 1 against a surface of an electro-cast Zac (trade mark) refractory article made of zirconia, alumina and silica preheated to 1200° C.

An adhereent fused refractory coating was formed.

EXAMPLE III

Example II was repeated but using the following starting mixture

|  | Amount by weight % | Average grain size μm | Specific surface $cm^2/g$. |
| --- | --- | --- | --- |
| $ZrO_2$ | 45–50 | 150 |  |
| $Al_2O_3$ | 43–38 | 100 |  |
| Si | 4 | 6 | 5000 |
| Al | 8 | 5 | 4700 |

EXAMPLE IV

Example II was repeated using the following starting mixture.

|  | Amount by weight % | Average grain size μm | Specific surface $cm^2/g$ |
| --- | --- | --- | --- |
| $ZrO_2$ | 88 | 150 |  |
| Si | 4–8 | 6 | 5000 |
| Al | 8–4 | 5 | 4700 |

EXAMPLE V

Example II was repeated using the following starting mixture

|  | Amount by weight % | Average grain size μm | Specific surface $cm^2/g$ |
| --- | --- | --- | --- |
| $ZrO_2$ | 30 | 150 |  |
| $Al_2O_3$ | 50 | 100 |  |
| Si | 14 | 6 | 5000 |
| Al | 6 | 5 | 4700 |

EXAMPLE VI

Example II was repeated using the following starting mixture.

|  | Amount by weight % | Average grain size μm | Specific surface $cm^2/g$ |
| --- | --- | --- | --- |
| $ZrO_2$ | 45 | 150 |  |
| $SiO_2$ | 28 | 80 |  |
| $Al_2O_3$ | 15 | 100 |  |
| Si | 6 | 6 | 5000 |
| Al | 6 | 5 | 4700 |

EXAMPLE VII

Fused silico-aluminous refractory articles were made by projecting starting mixtures of 80–90% by weight sillimanite and/or mullite in admixture with silicon-aluminium mixtures, the silicon content of the mixtures varying between 9 and 15% and the aluminium content being below 7%. The starting mixture was sprayed at a rate of 1 kg/minute in a stream of oxygen delivered at a rate of 180 L/minute onto moulds.

The sillimanite and/or mullite particles had an average grain size of 50 μm, and the silicon and aluminium particles had the respective granulometries set out in Examples II to VI.

Corhart (trade mark) standard blocks (containing by weight approximately 28% $SiO_2$ and 70% $Al_2O_3$) in glass and steel melting furnaces have been rebuilt in situ by spraying in the same way while the blocks being repaired were at a temperature in excess of 1000° C.

EXAMPLE VIII

A coking furnace wall formed of silica blocks mainly in the tridymite form was repaired in situ while at a temperature of 1150° C. by projecting onto it a starting mixture made up of 87% silica, 12% silicon and 1% aluminium (% by weight) delivered at a rate of 1 kg/minute in 200 L/minute oxygen. The silica used was made up of 3 parts cristoballite and 2 parts tridymite by weight with grain sizes between 100 μm and 2 mm. The silicon and aluminium particles each had an average grain size below 10 μm, the silicon having specific surface of 4000 $cm^2/g$ and the aluminium a specific surface of 6000 $cm^2/g$. The coherent refractory lining thus formed was adherent to the original silica furnace wall.

In none of the foregoing Examples did the maximum grain size of the particles of silicon or aluminium exceed 50 μm.

Where references are made to values of specific surface in this specification these are references to values derived by a classical permeametric method using Blaine's apparatus manufactured by Griffin & George Ltd, Wembley, England, and using the calculation method of Rigden.

We claim:

1. A process of forming a refractory mass comprising burning particles of exothermically oxidisable material having an average grain size less than 50 μm while mixed with particles of incombustible refractory material during projection of the mixture against a surface to form a coherent refractory mass on said surface, said oxidisable material comprises silicon and aluminum, the aluminum being present in an amount not exceeding 9% by weight of the total mixture, and wherein the aluminum and silicon are together present in an amount not exceeding 15% by weight of the total mixture.

2. A process according to claim 1, wherein the maximum grain size of said particles of silicon and aluminium is not more than 100 μm.

3. A process according to claim 1, wherein said oxidisable material has a specific surface greater than 3000 $cm^2/g$.

4. A process according to claim 3, wherein said silicon particles have a specific surface in the range 3000 to 8000 $cm^2/g$.

5. A process according to claim 3, wherein said aluminium particles have a specific surface in the range 3000 to 12000 $cm^2/g$.

6. A process according to claim 3, wherein each such oxidisable substance has a specific surface in the range 4000 to 6000 cm$^2$/g.

7. A process according to claim 1, wherein the aluminium and silicon are together present in an amount in the range 10% to 15% inclusive by weight of the total mixture.

8. A process according to claim 1, wherein the total mixture comprises by weight 9% to 15% inclusive silicon and up to 7% aluminium.

9. a process according to claim 1, wherein the total mixture comprises by weight 3% to 9% inclusive silicon and 3% to 9% aluminium.

10. A process according to claim 1, wherein said incombustible refractory material of said mixture comprises one or more of SiO$_2$, ZrO$_2$, Al$_2$O$_3$, MgO, sillmanite, mullite, zircon.

11. A process according to claim 1, wherein said incombustible refractory material of said mixture has an average grain size of less than 500 μm.

12. A process according to claim 1, wherein said incombustible refractory particles have an average grain size of less than 300 μm.

13. A process according to claim 1, wherein the maximum grain size of said particles of said silicon and aluminum is not more than 50 μm.

14. A process according to claim 1 wherein said oxidizable material consists of silicon and aluminum, the aluminum being present in an amount not exceeding 8% by weight of the total mixture, and wherein aluminum and silicon are together present in an amount not exceeding 12% by weight of the total mixture.

* * * * *

REEXAMINATION CERTIFICATE (1449th)

United States Patent [19]

Robyn et al.

[11] B1 4,489,022

[45] Certificate Issued Apr. 16, 1991

[54] FORMING COHERENT REFRACTORY MASSES

[75] Inventors: Pierre Robyn, Nivelles; Pierre Deschepper, Charleroi, both of Belgium

[73] Assignee: Glaverbel SA, Brussels, Belgium

Reexamination Request:
No. 90/001,894, Nov. 20, 1989

Reexamination Certificate for:
Patent No.: 4,489,022
Issued: Dec. 18, 1984
Appl. No.: 420,502
Filed: Sep. 17, 1982

[30] Foreign Application Priority Data

Nov. 25, 1981 [GB] United Kingdom ............... 8135569

[51] Int. Cl.$^5$ .............................................. F27D 1/16
[52] U.S. Cl. ................................. 264/30; 266/281
[58] Field of Search ............... 264/30; 75/27; 266/281

[56] References Cited

U.S. PATENT DOCUMENTS

| | | |
|---|---|---|
| 1,934,263 | 11/1933 | Hacks et al. |
| 2,741,822 | 4/1956 | Udy |
| 2,943,951 | 7/1960 | Haglund |
| 3,416,779 | 12/1968 | Campbell, Jr. |
| 3,533,375 | 10/1970 | McConnell |
| 3,684,560 | 8/1972 | Brichard et al. ............... 264/30 |
| 4,489,022 | 12/1984 | Robyn et al. ................... 264/30 |
| 4,792,468 | 12/1988 | Robyn et al. ................ 264/30 X |

FOREIGN PATENT DOCUMENTS

| | | |
|---|---|---|
| 956102 | 10/1974 | Canada |
| 2053420 | 8/1971 | Fed. Rep. of Germany |
| 1284282 | 1/1962 | France |
| 49-46364 | 12/1974 | Japan |
| 56-59679 | 5/1981 | Japan |
| WO79/00214 | 4/1979 | PCT Int'l Appl. |
| 102083 | 7/1941 | Sweden |
| 416452 | 9/1934 | United Kingdom |
| 991046 | 5/1965 | United Kingdom |
| 1151423 | 4/1969 | United Kingdom |
| 1330894 | 9/1973 | United Kingdom |
| 2035524 | 11/1978 | United Kingdom |
| 2103959 | 3/1983 | United Kingdom |
| 2109099 | 5/1983 | United Kingdom |

OTHER PUBLICATIONS

Chemical Abstracts, vol. 90, No. 14, Apr. 2, 1979, p. 306, No. 108728r, Columbus, Ohio, U.S.; & Japan A-78,123,417 (Kurosaki Refractories Co., Ltd.) 1978.

F. H. Clews et al., 23rd Report of Refractory Material Joint Sub-Committee, "The Hot-Patching of Gas Retorts", Part I Preliminary Experiments on the Application of Certain Cements, pp. 733-748 (1932).

F. H. Clews et al., published in the bulletin of the British Refractories Research Association, "The Hot Patching of Gas Retorts", Part II: Experiment on the use of Dry Powdered Cements Containing Silicon and Aluminum, No. 32, 24th Report of Refractory Materials Joint Sub-Committee, pp. 286-298 (1933).

T. F. E. Rhead et al., published in The Proceedings of the Institution of Gas Engineers, "Hot Patching of Retorts by Blow Pipe Spray Welding," 10th Autumn Research Meeting, London 1st and 2nd Nov. 1938, pp. 329-386.

Margaret E. Harris et al., published in Proceedings of the Third Symposium on Combustion, Flame and Explosion Phenomena, "Burning Velocities, Quenching, and Stability Data on Nonturbulent Flames of Methane and Propane with Oxygen and Nitrogen", pp. 80-83 (1949).

H. M. Cassel et al, published in Proceedings of the Third Symposium on Combustion, Flame and Explosion Phenomena, "Factors Affecting Flame Propagation through Dust Clouds", pp. 185-190 (1949).

Whol et al, published in Proceedings of the Third Symposium on Combustion, Flame and Explosion Phenomena, "Flame Stabilization and Quenching", pp. 4-11 (1949).

J. S. Forsyth et al., published in Proceedings of the Third Symposium on Combustion, Flame and Explosion Phenomena, "The Mechanism of Flashback of Aerated Flames", pp. 8, 100-102 (1949).

K. C. Brown et al., published by the Ministry of Labour and National Service, "Prevention of the Propagation of Flame in Aluminium Dust Explosion", pp. 1-17 (1951).

National Fire Protection Association "Dust Explosions", pp. 216-217.

Excerpt from article published in National Institute of Fuel "Combustion and Gasification" by Essenhigh and Perry, pp. D-6 - D-7) (1958).

Murray Jacobson et al., published by U.S. Bureau of Mines "Explosibility of Metal Powders" (1964).

John Nagy et al., published by the U.S. Bureau of Mines "Preventing Ignition of Dust Dispersions by Inerting", pp. 1-25 (1964).

Monica M. Raftery, published by British Ministry of Technology, "Explosibility Tests for Industrial Dusts", pp. 1-4, 9-10 (1968).

K. N. Palmer, published by Halstead Press, "Dust Explosion and Fires", pp. 108-155 (1972).

K. Annett et al., published in the Journal of the Canadian Ceramic Society, "Repair of Glass Furnaces by Ceramic Welding Techniques", pp. 34-38 (1981).

Joseph J. Innace, published in 44 Metal Producing Reprint, "Ceramic Welding: It's not for all Coke Makers, but . . . ", pp. 67-68 (1982).

John R. Lee, Iron Making Conference Reprints, "Ceramic Welding of Cross Wall Leaks in a Coke Oven Battery", pp. 180-183 (1988).

Keisuke Hiragushi et al., published in Nippon Steel Technical Report No. 19, "Flame-Gunning Repair of Coke Ovens", pp. 94-105 (1982).

"Ceramic Welding" (a History of the Fosbel Process Ceramic Welding), cover page, pp. 1 to 3, Sep. 1986.

John R. Lee, Ironmaking Proceedings, vol. 40, pp. 180 to 183, Mar.-Apr. 29, 1987.

B1 4,489,022

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1, 2, 3, 4, 5, 6, 7, 8, 9, 10, 11, 12, 13 and 14 is confirmed.

New claims 15, 16, 17, 18, 19, 20, 21, 22, 23, 24, 25, 26, 27 and 28 are added and determined to be patentable.

*15. A process of forming a refractory mass comprising the steps of projecting against a surface particles of exothermically oxidizable material which burn by combining with oxygen with accompanying evolution of heat, said particles having an average particle grain size less than 50 microns mixed with particles of incombustible refractory material and burning said exothermically oxidizable material in the presence of the particles of incombustible refractory material, said oxidizable and incombustible particles being composed so that under the heat of combustion a coherent refractory mass is formed against said surface from said oxidizable and incombustible particles, wherein said oxidizable material comprises silicon and aluminum, the aluminum being present in an amount not exceeding 9% by weight of the total mixture, and wherein the aluminum and silicon together are present in an amount not exceeding 15% by weight of the total mixture.*

*16. A process according to claim 15, wherein the maximum grain size of said particles of silicon and aluminum is not more than 100 microns.*

*17. A process according to claim 15, wherein said oxidizable material has a specific surface greater than 3000 $cm^2/g$.*

*18. A process according to claim 17, wherein said silicon particles have a specific surface in the range 3000 to 8000 $cm^2/g$.*

*19. A process according to claim 17, wherein said aluminum particles have a specific surface in the range 3000 to 12000 $cm^2/g$.*

*20. A process according to claim 17, wherein each such oxidizable substance has a specific surface in the range 4000 to 6000 $cm^2/g$.*

*21. A process according to claim 15, wherein the aluminum and silicon are together present in an amount in the range 10% to 15% inclusive by weight of the total mixture.*

*22. A process according to claim 15, wherein the total mixture comprises by weight 9% to 15% inclusive silicon and up to 7% aluminum.*

*23. A process according to claim 15, wherein the total mixture comprises by weight 3% to 9% inclusive silicon and 3% to 9% aluminum.*

*24. A process according to claim 15, wherein said incombustible refractory material of said mixture comprises one or more of $SiO_2$, $ZrO_2$, $Al_2O_3$, MgO, sillmanite, mullite, zircon.*

*25. A process according to claim 15, wherein said incombustible refractory material of said mixture has an average grain size of less than 500 microns.*

*26. A process according to claim 15, wherein said incombustible refractory particles have an average grain size of less than 300 microns.*

*27. A process according to claim 15, wherein the maximum grain size of said particles of silicon and aluminum is not more than 50 microns.*

*28. A process according to claim 15, wherein said oxidizable material consists of silicon and aluminum, the aluminum being present in an amount not exceeding 8% by weight of the total mixture, and wherein aluminum and silicon are together present in an amount not exceeding 12% by weight of the total mixture.*

* * * * *